Figure 1:
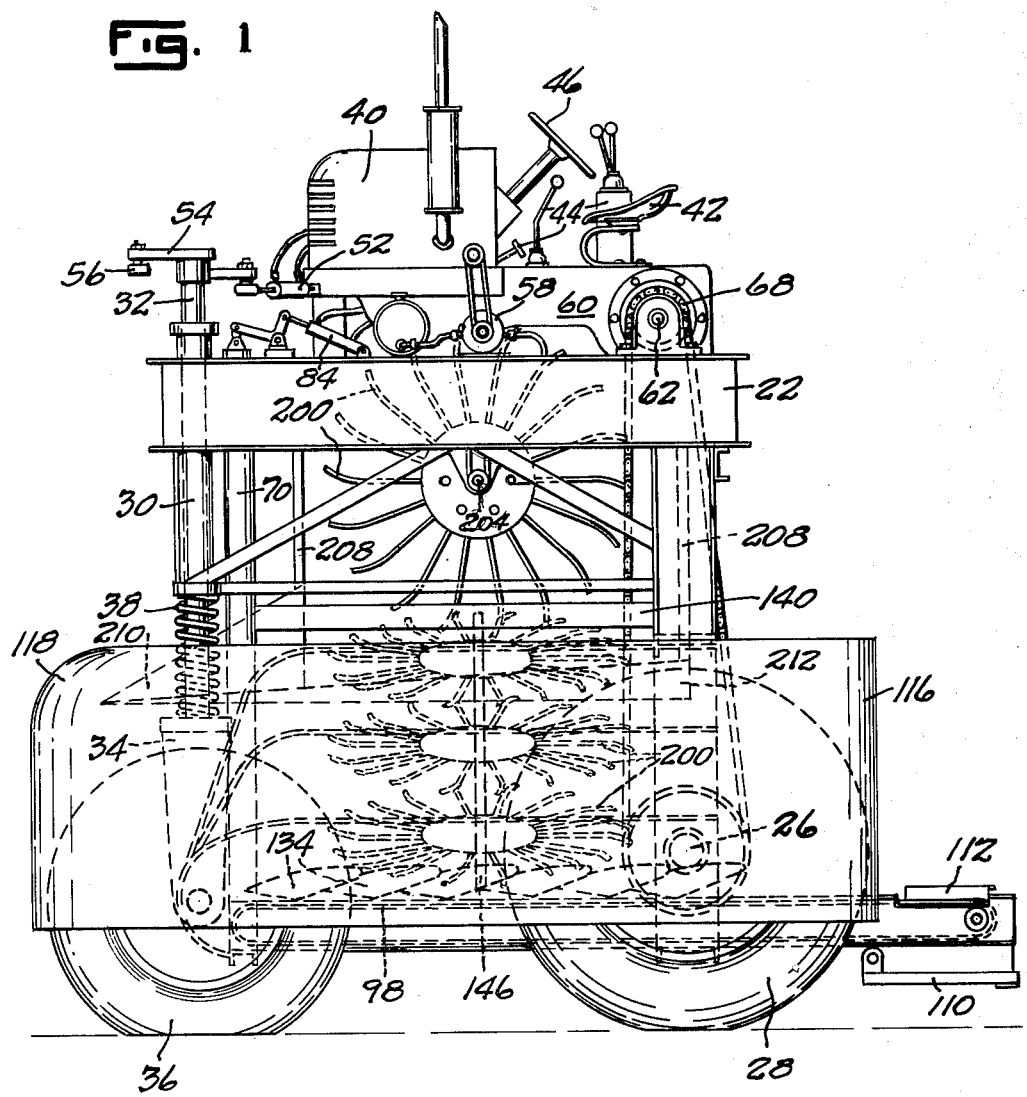

June 14, 1966 E. E. PERTICS 3,255,578
BERRY PICKER

Filed May 22, 1964 6 Sheets-Sheet 1

INVENTOR.
EMIL E. PERTICS
BY
ATTORNEY

June 14, 1966  E. E. PERTICS  3,255,578
BERRY PICKER
Filed May 22, 1964  6 Sheets-Sheet 2

INVENTOR.
EMIL E. PERTICS
BY
ATTORNEY

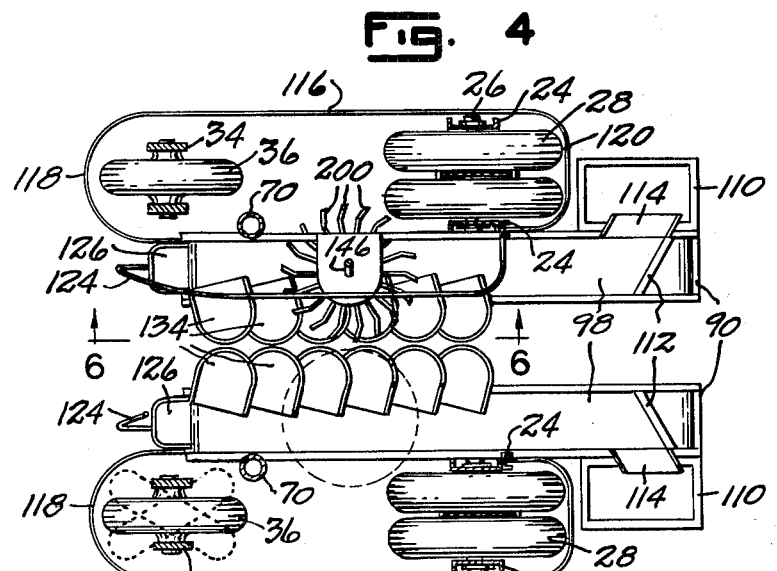
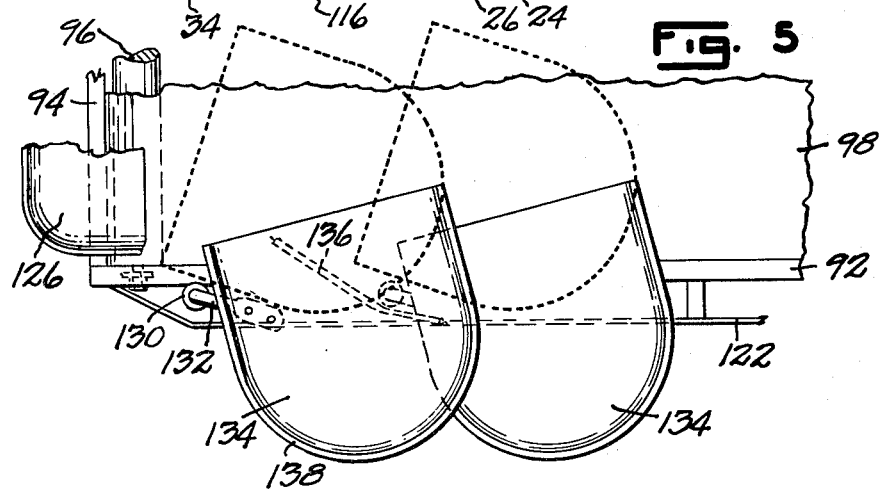
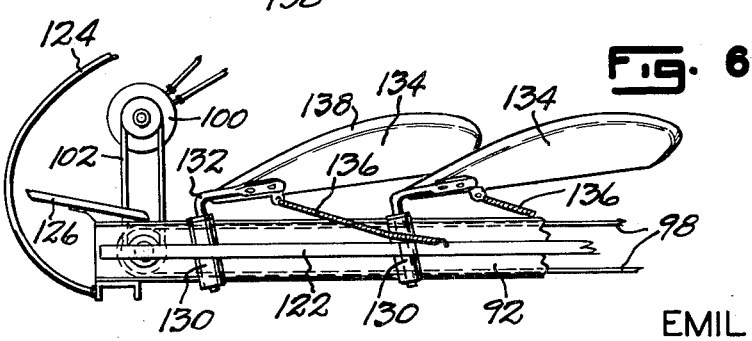
INVENTOR.
EMIL E. PERTICS

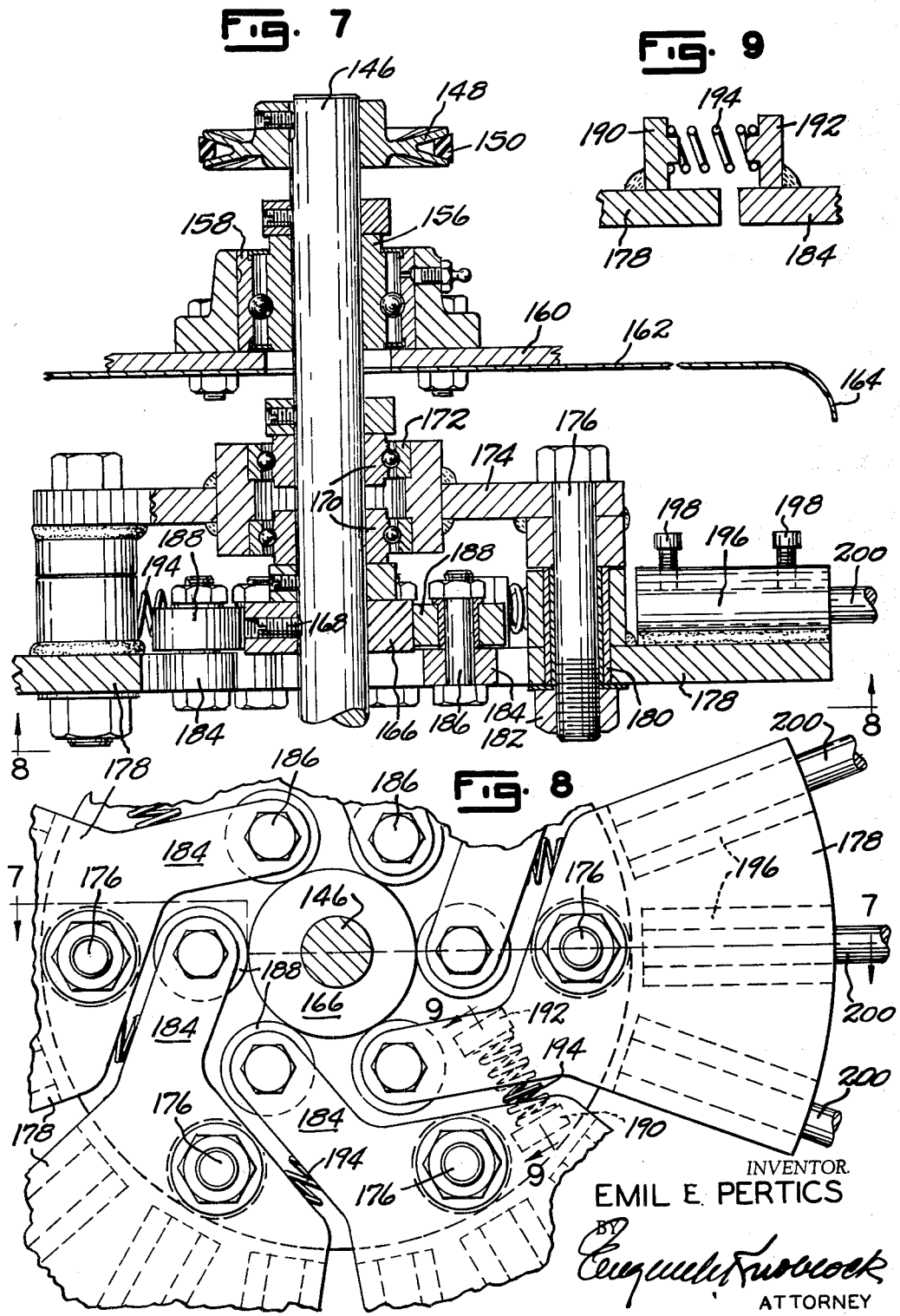

June 14, 1966   E. E. PERTICS   3,255,578
BERRY PICKER
Filed May 22, 1964   6 Sheets-Sheet 5
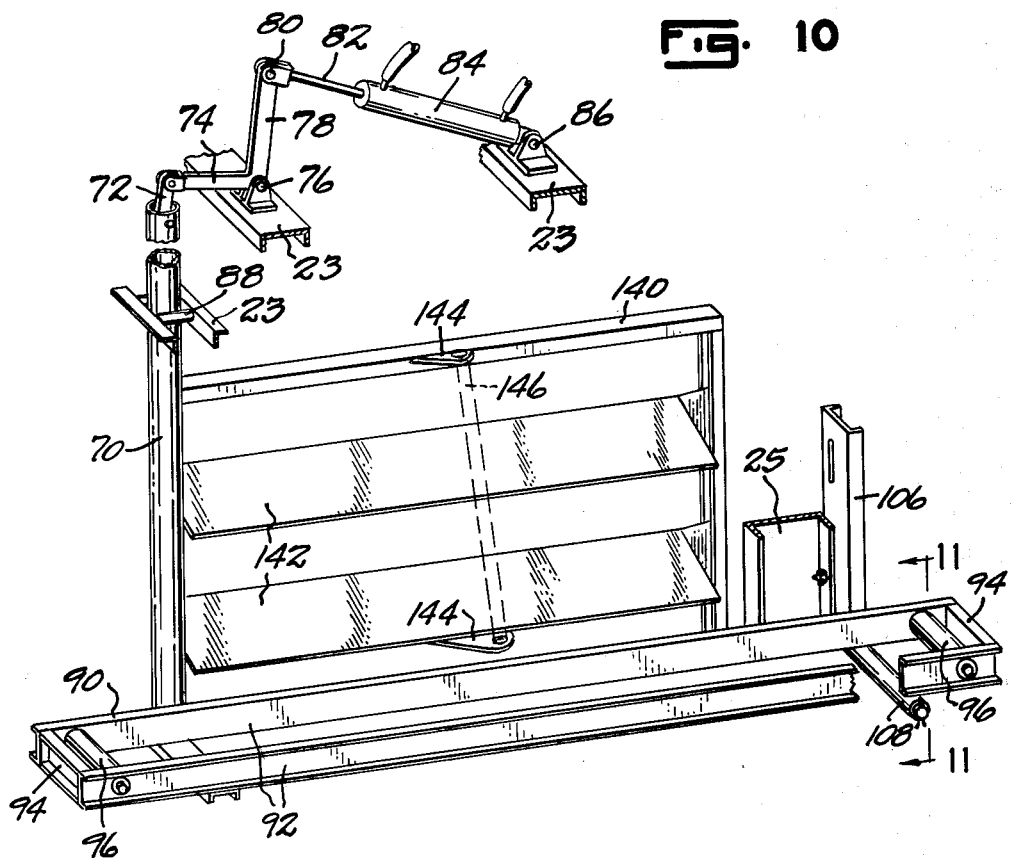
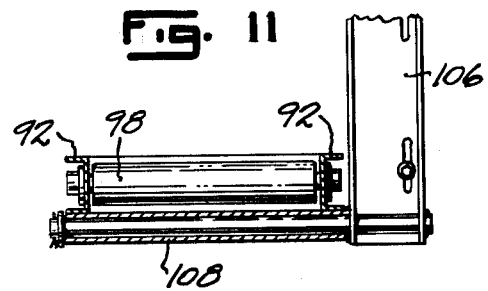
INVENTOR.
EMIL E. PERTICS
BY
ATTORNEY June 14, 1966        E. E. PERTICS        3,255,578
BERRY PICKER
Filed May 22, 1964        6 Sheets-Sheet 6
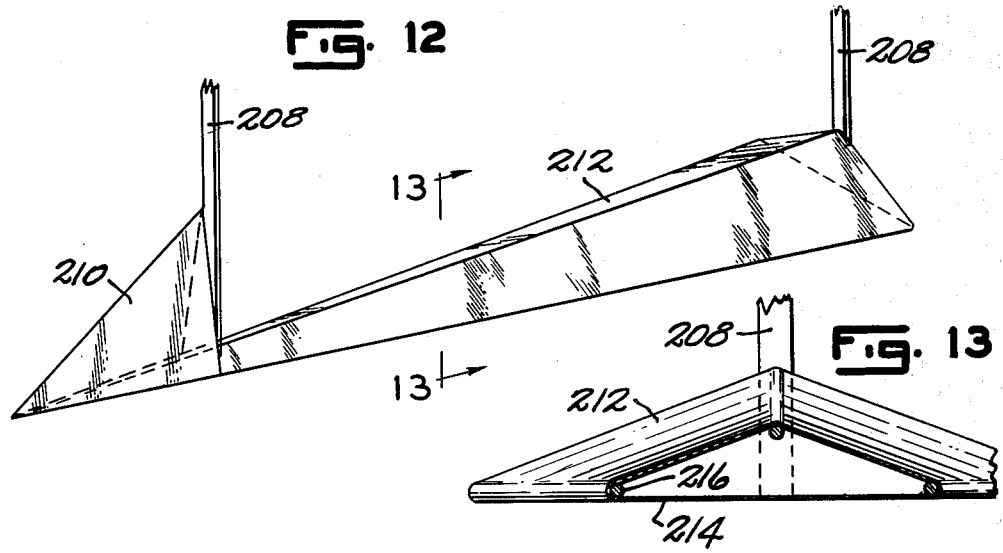
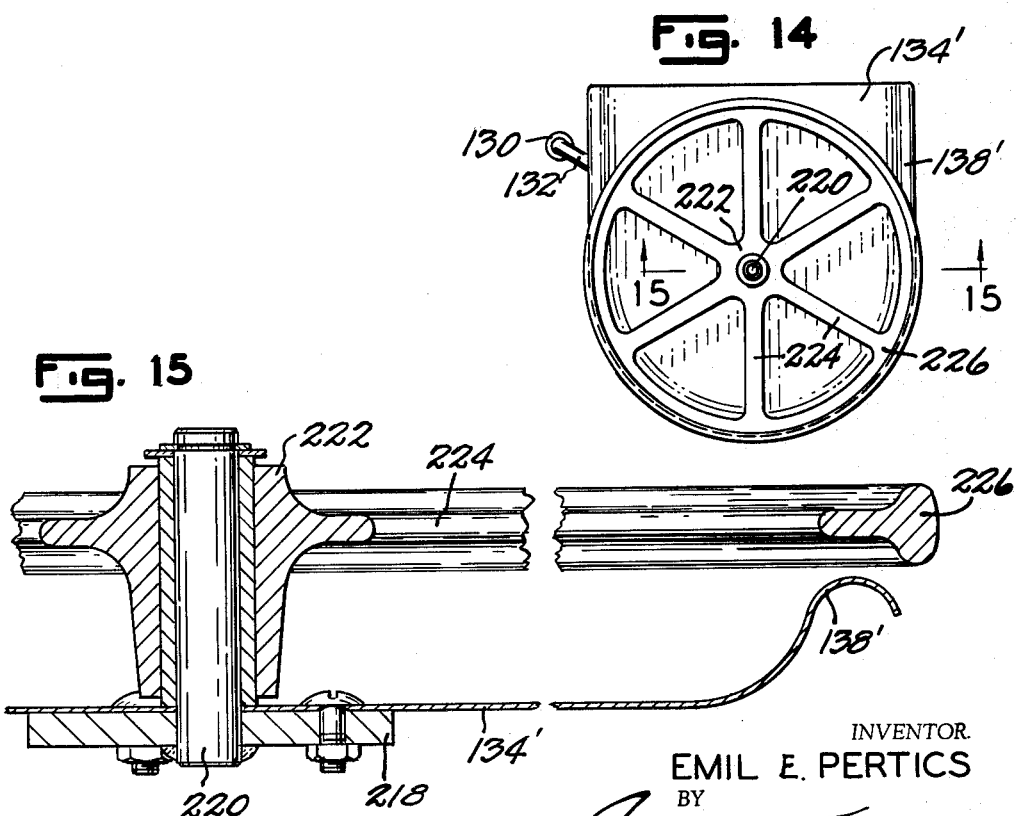
INVENTOR.
EMIL E. PERTICS
BY
ATTORNEY

United States Patent Office 3,255,578
Patented June 14, 1966

3,255,578
BERRY PICKER
Emil E. Pertics, Lapaz, Ind., assignor of forty-five percent to Ernest Pertics, Lapaz, Ind.
Filed May 22, 1964, Ser. No. 369,487
15 Claims. (Cl. 56—330)

This invention relates to improvements in berry pickers, and more particularly to a device for picking blueberries.

The harvesting of berries which grow upon bushes, such as blueberries, is a time-consuming, laborious task which entails a high expense when it is performed manually. Various efforts have been made to produce a device which will accelerate the picking of berries, but these devices have had limited utility and have not been made fully automatic nor have they been successful in harvesting a high percentage of the berries upon a bush without wastage. Therefore, it is the primary object of this invention to provide an automatic self-propelled device which will harvest berries from bushes with rapidity and a high percentage of collection without substantial injury to the berries, and with minimum requirement for manual labor.

A further object is to provide a device of this character which has novel means for picking berries from a bush and discharging them upon a collecting mechanism for delivery to a collection receptacle.

A further object is to provide a device of this character having novel means for shaking a berry-containing bush as it passes the bush, and novel means for retrieving discharged berries and directing them to a collection receptacle.

A further object is to provide a device of this character consisting of a self-propelled vehicle adapted to straddle bushes in a row and having freely rotatable finger-bearing members which are subject to vibration and which contact the branches of a bush as it moves therepast in such a way as to impart to the bush vibration to release berries from the bush without damaging the bush by breaking of branches therefrom.

A further object is to provide a device of this character having a novel berry-collecting mechanism wherein two sets of pivoted collection pans are mounted at a low level to engage the lower portion of a bush below the branches thereof and to receive thereon berries discharged from the bush, said collection receptacles directing berries collected thereon to a berry-collecting conveyor and being successively shiftable as they contact a bush to avoid injury to the bush, while maintaining minimum free space through which berries may pass to the ground.

Other objects will be apparent from the following specification.

Figure 2:
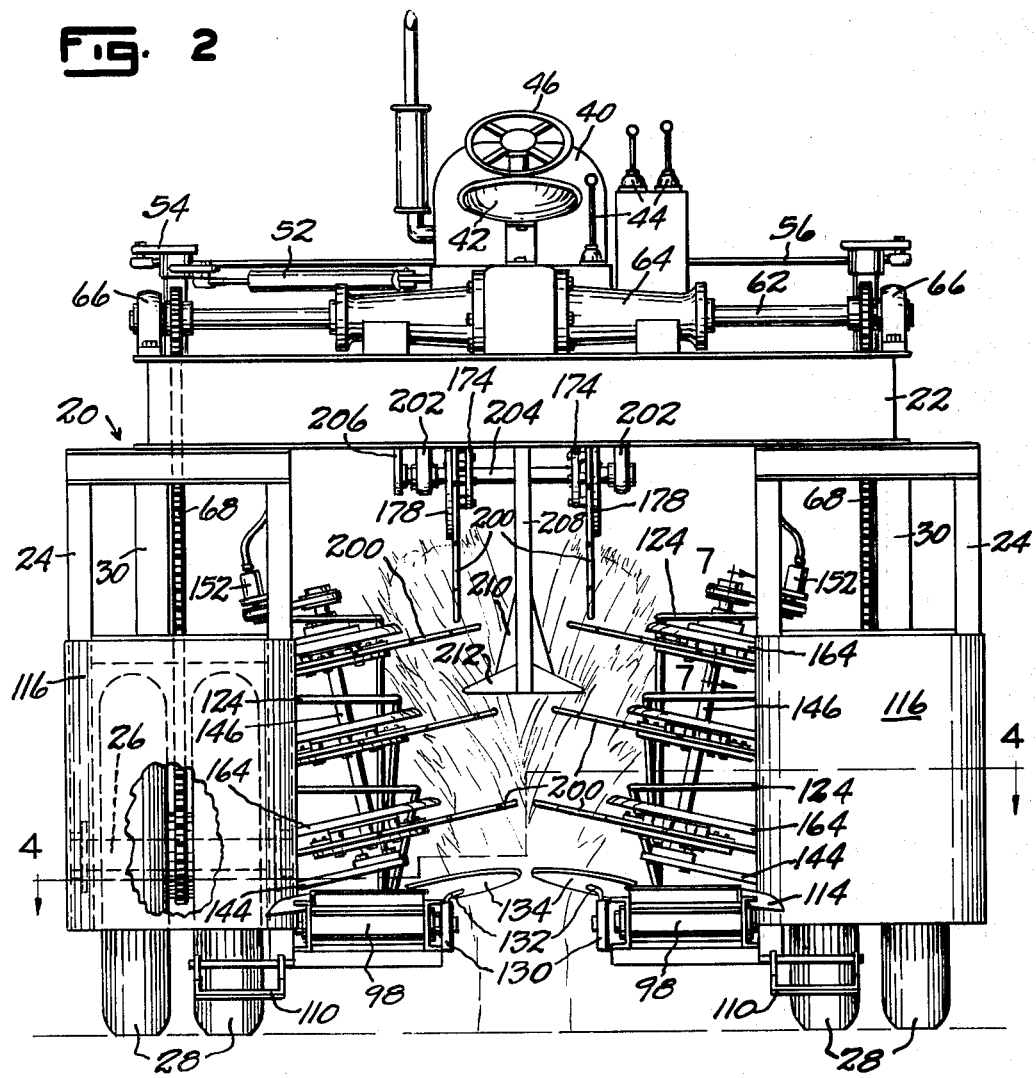
Figure 3:
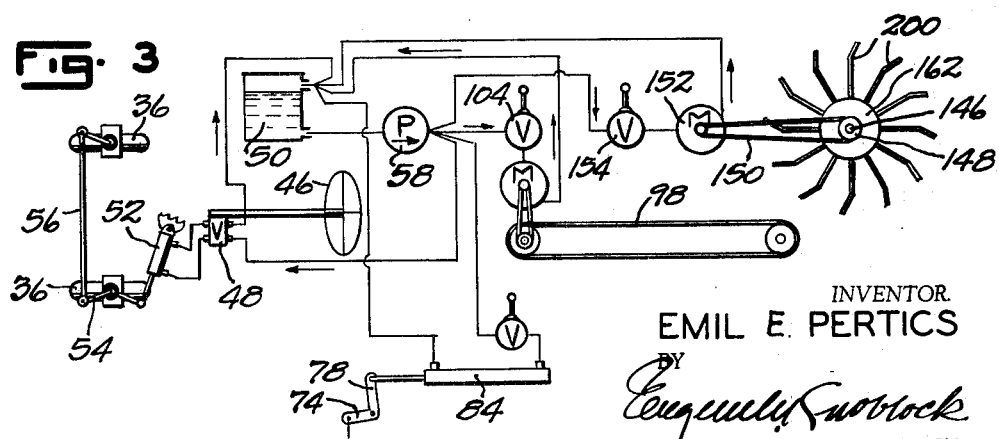

In the drawings:

FIG. 1 is a view of the device in side elevation;
FIG. 2 is a view of the device in rear elevation;
FIG. 3 is a schematic view illustrating the controls for power-driven parts of the device;
FIG. 4 is a horizontal sectional view taken on line 4—4 of FIG. 2;
FIG. 5 is an enlarged fragmentary plan view illustrating the berry-collecting means of the device;
FIG. 6 is a view in side elevation illustrating the berry-collecting means;
FIG. 7 is an enlarged fragmentary axial sectional view of the vibratory rotatable berry-releasing means of the device, taken on line 7—7 of FIG. 8;
FIG. 8 is an enlarged fragmentary bottom plan view of the rotatable vibrating berry-releasing means, as viewed on line 8—8 of FIG. 7;
FIG. 9 is a fragmentary detail sectional view taken on line 9—9 of FIG. 8;
FIG. 10 is a fragmentary perspective view of a portion of the frame and the conveyor at one side of the device, illustrating a modified embodiment of the invention;
FIG. 11 is a vertical sectional view taken on line 11—11 of FIG. 10;
FIG. 12 is a perspective view of bush-deflecting means incorporated in the device;
FIG. 13 is an enlarged vertical transverse sectional view taken on line 13—13 of FIG. 12;
FIG. 14 is a top plan view of a modified embodiment of a berry-collecting pan utilized in the device;
FIG. 15 is an enlarged sectional view taken on line 15—15 of FIG. 14.

Referring to the drawings, and particularly to FIGS. 1 to 9, inclusive, which illustrate one embodiment of the invention, the numeral 20 designates a vehicle frame which is characterized by an elevated chassis 22 supported upon vertically elongated rear frame structures 24, preferably including inner and outer vertical frame members mounting suitable bearings for journalling the opposite ends of short rear axle members 26, each preferably mounting a pair of rear wheels 28 in slightly spaced relation, as seen in FIGS. 2 and 4. The front of the chassis 22 is supported by a dirigible wheeled structure. As here shown, this structure includes a pair of laterally spaced tubular members 30 projecting downwardly from the chassis 22 and having journaled therein elongated vertical shafts 32 at whose lower ends are mounted fork members 34 which journal and support front wheels 36. The front wheels have spring suspension, here shown as a coil spring 38 encircling each shaft 32 and bearing at its lower end upon the upper end of the associated fork member and at its upper end engaging the lower end of the tubular member 30.

The chassis mounts an engine 40, an operator's seat 42, and various drive mechanisms actuated by controls 44 adjacent to the operator's seat. Thus steering wheel 46 preferably actuates a steering valve 48 which controls flow of fluid under pressure from a pressure reservoir 50 to a double-acting steering power member 52 which controls one of two steering arms 54 or cranks mounted upon the shafts 32 and interconnected by tie rod 56. The engine 40 operates the pump 58 which supplies pressure to the liquid in the reservoir 50. The engine also actuates drive transmission means 60 of any suitable character adapted to actuate an axle 62 journaled in an axle housing 64 and in bearings 66 carried by opposite sides of the chassis 22. Adjacent each end the axle 62 mounts a sprocket upon which is trained a drive chain 68. Each chain 68 is in turn trained around a sprocket carried by the adjacent rear axle member 26 and preferably positioned between the two rear wheels 28, as seen in FIG. 2.

A pair of laterally spaced front vertical adjustable members 70 are positioned adjacent to the front steering wheels 36 at opposite sides of the device and are preferably supported as best illustrated in FIG. 10 by connection of a pivoted link 72 at the upper end thereof to means for adjusting them vertically and to retaining them in selected vertical elevation. One adjusting mechanism is illustrated in FIG. 10 wherein a link 72 is pivoted to the upper end of each member 70 and, in turn, is pivoted to a substantially horizontal arm 74 of a bellcrank which in turn is pivoted at 76 to the chassis at 23. A second arm 78 of the bellcrank has pivotally connected thereto at 80 a power member, such as the end of a piston rod 82 of a double-acting hydraulic power member 84 which in turn is pivoted at 86 to another member 23 of the chassis. The upper end of each adjustor member 70 is provided with a suitable guide 88 carried by chassis frame part 23.

Each front upright member 70 supports the front end of an elongated conveyor frame 90 which preferably includes spaced longitudinal frame members 92 and end members 94. Rollers 96 are journaled at the opposite ends of the conveyor frame 90 and have a conveyor belt 98 trained therearound. The conveyor frames 90 are located inwardly of the wheels, as best seen in FIG. 4, and project rearwardly from the rear wheels and to a point forwardly of the members 70 and between the steering wheels 36. Any suitable means may be provided to operate the conveyors and, as illustrated in FIGS. 3 and 6, such means may include a fluid motor 100 having a drive connection through belt 102 with one of the roller pulleys 96 the drive motor 100 being controlled by manual control valve 104. The rear portion of the conveyor frame 90 is supported from an inner rear frame part 25 on which is vertically adjustably mounted a vertical support member 106 carrying a lateral arm upon which is pivoted a transverse tube 108 fixed to the rear of the conveyor frame 90 to accommodate vertical adjustment of the conveyor frame 90 incident to change in the elevation of the front conveyor support member 70.

At its rear end the carrier mounts an outwardly projecting low level container or receptacle support 110 for a receptacle (not shown) and the conveyor frame also mounts deflecting members 112 adjacent to the receptacle support for diverting berries at the rear end of the belt laterally to chute members 114 extending to a position above the receptacle support 110.

Each conveyor frame 90 serves as a means to support a guard 116. Each guard consists of an elongated plate anchored at its front end to the front of a frame 90 and projecting thereabove. The front of the guard at 118 is curved outwardly to extend around the upper portion of the adjacent steering wheel 36. The guard passes outwardly of the front and rear wheels, and its rear part 120 is bent inwardly around the rear wheels 28 to be anchored to the conveyor frame 90 forwardly of the receptacle support 110. It will be seen that the guards 116 serve as means to deflect branches of bushes in adjacent rows as the device travels along in a path straddling the bushes in an intervening row. Thus the guards minimize damage to adjacent bushes, while at the same time leaving open the space above the conveyor and between the wheels 36 for purposes to be described. The inner longitudinal member 92 of each frame also mounts a longitudinal guard or bumper bar 122 spaced from member 92 and adapted to extend for selected part of the length of the conveyor frame 92 at the front end thereof for the purpose of contacting and deflecting the branches of a bush from which berries are being picked, that is, from the bush which is being straddled by the device. The conveyor frame may also support one or more bush-deflector bars 124 bent upwardly and inwardly from the front part of the conveyor frame and extending for a selected portion of the length of the frame. At the front of each conveyor frame is preferably mounted an inclined tray 126 projecting forwardly of the frame with its rear overlying the front of the conveyor belt 98 so that the berries which fall adjacent the front of the conveyor frame may be collected and directed to the conveyor belt.

The inner longitudinal frame member 92 of each conveyor frame 90 at longitudinally spaced intervals at the front portion thereof mounts a plurality of inclined journal tubes 130. The tubes incline downwardly and rearwardly at a small angle, as best seen in FIG. 6, and provide means for journaling one end portion of each of a plurality of collector plates 134. The collector plates project inwardly from the conveyor frame bumper bar, as seen in FIG. 5, in their normal position and are urged to the full line position shown in FIG. 5 by springs 136. The collector plates 134 are preferably provided with upturned marginal flanges 138 of substantially U-shape form and plan, as seen in FIG. 5, with the flanges terminating at the outer ends of the plates which overlie the conveyor belt 98. The collector plates are tilted at a slight angle forwardly and downwardly thereof with respect to the direction of travel of the device, and also outwardly and downwardly thereof so as to cause berries, which fall thereon, to be diverted thereby to roll onto the conveyor belt 98. This arrangement permits the partial overlapping arrangement of the plates 134, as illustrated in FIGS. 4 and 5, and also permits the plates to swing outwardly as they successively contact a bush which is being passed, and to automatically return to inwardly projecting position, providing maximum berry-collection and minimum space for droppage of berries to the ground after each individual plate passes the branches of the bush. Also, it will be seen that the amount of deflection of the plates is limited to that required by the shape of each individual bush, and that the rounded up-turned flange 138 minimizes the possibility of injury or damage of the branches of the bush by the edges of the plate which engage it.

Each conveyor frame 90 at the outer portion thereof preferably mounts a vertical frame structure 140, as illustrated in FIG. 10. The frame 140 preferably mounts a plurality of vertically spaced longitudinally extending downwardly and inwardly inclined deflector plates 142 which are spaced apart and also spaced preferably from the frame parts 90 and 140. The vertical side structures 140, 142 preferably include upper and lower brackets 144 substantially mid-length of the vertical frame 140 and serving to journal the upper and lower ends of a shaft 146 which is inclined downwardly and inwardly as best seen in FIG. 2, which shafts 146 are positioned inwardly relative to the guards 116 and above the conveyor belts 98. Each shaft 146 is journaled in the supports 144 and is power driven. Thus at the upper end of each shaft may be mounted a pulley 148 around which is trained a drive belt 150 in turn driven by a pulley on a motor 152, such as a hydraulic motor, which is operated under the control of a valve 154.

At a plurality of vertically spaced points along the length thereof each shaft mounts a bearing 156 which may include an outer race 158 upon which is secured at its lower end a plate 160 which in turn serves to secure a deflector plate 162 or disk having a rounded downturned marginal portion 164, as best seen in FIG. 7. Each of the deflector plates 162 is thus free to rotate or to remain stationary, depending upon the condition of an object, such as a branch of a bush which it engages. Further, it will be seen that any berries which may fall thereon are deflected outwardly thereby so as to fall free of the mechanism to be described, which is positioned immediately below each deflector plate. Each deflector plate will preferably be located above one of the inclined deflector plates 142 on the frame 140 so that any berries falling therefrom at the outer portion of the mechanism, that is outwardly of the conveyor frame, will be deflected inwardly toward the conveyor frame by the plates 142 for ultimate collection upon the conveyor 98.

Free rotating or idler vibratory bush-shaking units or assemblies are located immediately below the respective deflector disks 162 and are of the construction best seen in FIGS. 7, 8 and 9. Each of the vibrator units is characterized by an eccentrically mounted cam disk 166 fixed to the shaft 146 in spaced relation below a deflector disk 162 as by means of a set screw 168. Immediately above each cam disk 166 is mounted the inner race 170 of one or more bearings whose outer races 172 carry a disk or plate 174. The plate 174 mounts a plurality of depending members in equispaced relation to each other adjacent the circumference of the plate 174, such means preferably constituting a cap screw 176 whose head bears upon the plate 174 and whose shank projects downwardly therefrom. Each cap screw has a lower portion which journals a carrier 178 which is preferably in the nature of a segment of a circular member. Each carrier preferably includes a journal sleeve 180 and is retained in place by a releasable retainer 182, such as a nut threaded on the shank of the cap screw 176. Each carrier has an inwardly projecting narrow arm portion 184 extending adjacent to the cam disk 166 and mounting a pivot member 186, such as a cap screw projecting upwardly from arm 184 and journaling a roller 188 engaging cam disk 166 and serving as a cam follower. Each carrier 178 has an abutment 190 projecting upwardly therefrom, and each carrier arm 184 has an abutment 192 projecting upwardly therefrom. An expansion coil spring 194 is interposed between abutments 190 and 192. The springs 194 are so oriented, as best seen in FIG. 8, as to swing the carrier 178 and its arm 184 in a rotative direction to urge the cam follower roller 188 into engagement with the cam disk 166. Each of the carriers 178 preferably includes a plurality of spaced outwardly diverging clamp members 196, such as elongated sleeves which are preferably positioned substantially radially with respect to the shaft 146. Each carrier clamp 196 may include lock means, such as set screws 198, for firmly but detachably mounting therein the inner end portion of an elongated vibrator bush-contacting arm 200. The vibrator arms are preferably elongated spring metal bars whose tips preferably extend outwardly beyond the circumference of the deflector disks 162 a predetermined distance. In the preferred arrangement the arms 200 will be of a length so that those of the lower sets will have their tips spaced only a slight distance, as seen in FIG. 2.

It will be apparent that as the device traverses a row of bushes, straddling those bushes, vertically spaced sets of fingers 200 will contact each bush at each side thereof. The supporting means 174 for the finger carriers 178 is journaled freely relative to the shaft 146 so that it is not rotated thereby through any direct means and may either rotate therewith or be held against rotation. Thus as the device moves to bring the fingered rotary idling units into contact with the opposite sides of a bush and the branches thereof, the fingers may be turned or swung by the branches so as to fit into or project into the bush. This results in minimum injury to the bush with respect to breakage of the branches of the bush and also with respect to scaling, cutting or tearing of the bark or sheath of each branch contacted. At the same time, it permits the fingers to come into intimate contact with the branches at spaced points and at several elevations. This intimate multiple point contact is important by virtue of the transmission to the branches of vibratory motion which is imparted to the fingers 200 by the finger carriers 178 by reason of the engagement of the rollers 188 with the cam disk 166 by the pressure exerted by the springs 194. Consequently, the rotor fingers 200 transmit vibration to substantial portions of the bush at different elevations and at both sides thereof. Fingers 200 freely change their position or orientation relative to the bush as required by the traveling movement of the device and as permitted by the free rotation of the individual finger groups upon the respective shafts 146. The arrangement permits effective shaking of all portions of each of the two sides of a bush so as to cause a high percentage of the berries carried by each bush to be shaken from the bush for collection upon the conveyor belt 98 as guided by the various deflector means, collector plates and the like.

If desired, one or more rotary vibration transmitting units may be mounted upon the chassis 22 in a manner to engage the upper portions of bushes. Such an arrangement is illustrated in FIGS. 1 and 2 wherein bearings 202 carried by the chassis 22 journal an elevated transverse shaft 204 having a suitable power drive, such as a drive utilizing a belt 206, driven by any suitable power member (not shown). Shaft 204 carries one or more disks 174, as previously described, with which are associated rockably carriers 178 for vibrating projecting fingers 200. I prefer to utilize two such sets of vibrating rotors, as illustrated in FIG. 2, so arranged that the tips of the lowermost fingers will be positioned adjacent the tips of the innermost fingers of the upper sets of the fingers mounted on the upright shafts 146.

In some instances it may be desired to provide bush deflecting means for assuring that all portions of a bush are brought close to the vibrating sets of fingers, and one such bush deflecting means is illustrated in FIGS. 2, 12 and 13. This construction entails the mounting of rigid longitudinally spaced depending supports 208 upon the chassis 22 with the front support member 208 extending forwardly relative to the adjacent sets of fingers 200 and with the rear member 208 preferably positioned rearwardly of the shafts 146 and therebetween. A bush divider or deflector may include a leading part 210 of triangular shape in side elevation and preferably formed by a pair of inclined triangular plates projecting forwardly from the front support 208 and inclined at a downwardly diverging angle to each other. The lower margin of the deflector spreader 210 may preferably be beaded or rolled inwardly to avoid sharp edges along the lower margin of the deflector. The rear deflector portion 212 preferably flares rearwardly from the rear of the front portion 210 and may be formed by a pair of plates extending at an angle to each other and interconnected by a bottom plate 214, as shown in FIG. 13, with the margins of the spreader plates defined by tubular or circular bars 216 of the supporting frame. The arrangement is such that the spreaders 210 and 212, whose elevation may be adjusted at will by any means found suitable (but not shown) will be caused to enter the upper portions of the bushes in the row being traversed by the device, so as to spread the upper portion of the bushes and deflect each laterally, as seen in FIG. 2, thus insuring that the upper portion of each bush will be positioned close to the fingers 200 of the uppermost set on each shaft 146.

In the event it is desired to increase the protection to the lower parts of the bushes which are engaged by the collector plates 134, a construction such as illustrated in FIGS. 14 and 15 may be utilized. In this construction, the collector plates 134' are of substantially the same construction as the plates 134 previously described and are mounted upon carriers 132 to swing in inclined journals 130, as previously described. The central portion of each plate is preferably reinforced by a member 218 at its bottom and reinforcing member 218 carries an upwardly projecting pin or shaft 220. Pin 220 journals the hub 222 of a rotary member having radiating spokes 224 and a smooth circular rim 226. The rim 226 is preferably of a diameter such that it projects slightly beyond or outwardly of the upturned marginal flange 138' of the collector plate 134', and the rim 226 is positioned adjacent to the flange 138', that is, slightly thereabove. The arrangement is such that the rotor rim 226 is free to turn as it contacts the lower portion of a bush and thus avoids rubbing contact of the marginal portions of the collector plates with the bush.

In the use of the device one man can operate the equipment with the assistance of one or two men who can handle the containers or receptacles by removing filled receptacles from the support 110 and replacing them with empty receptacles, and with the further assistance of helpers to collect the filled receptacles. Alternatively, small trailers may be used trailing the equipment at each side thereof onto which filled receptacles can be placed and from which a supply of empty receptacles can be taken by workers. Thus a large volume of berries can be harvested by a very few persons without substantial risk to either the product or the bushes and with assurance of a high percentage of collection of the berries. The rapidity with which the machine travels will far exceed the rapidity with which crews of hand pickers may strip bushes of fruit or berries by present methods, and the thoroughness of the picking will usually substantiallly exceed the thoroughness with which hand pickers function. In this connection, in blueberry cultivation it is common that a large acreage of blueberry planting will require large numbers of transient workers for picking. The recruitment of such workers, their maintenance during limited harvest periods, and their lack of concern for or sense of responsibility to avoid injury to bushes are all avoided when this device is utilized.

It will be apparent that the operator of the device, when mounted upon the seat 42, has a clear view of the row of bushes which the machine traverses, so that he can steer the equipment accurately to accomplish the berry-picking operation with minimum prospect of injury to the bushes. The provision of guards 116, 122 and 124 minimizes engagement and breakage of plants or bushes. The deflection means with the swinging collector plates 134, the deflectors 146 and the belt conveyors 98 accomplish a high precentage of retention of berries which are released from the bushes by the operation of the device, and are so positioned as to insure minimum damage to the product and to the bushes. The freely rotatable radial vibrating arms enter into a bush at multiple points so as to effectively vibrate the bush and minimize injury to the bush while accommodating the position of the vibrating element to the limb or branch arrangement in the bush and to the speed of advance of the vehicle. All of these features result in a device of superior utility for its intended purpose, providing economical and rapid performance of a harvesting operation. Because of the speed at which the apparatus can operate, the user is able to pick the fruit in a short period of time while the fruit is in optimum marketing condition and the user is thus freed from the problem of labor recruitment and maintenance and the uncertainties of weather as they affect the product as it approaches the picking stage.

While the preferred embodiment of the invention has been illustrated, it will be understood that changes in the construction may be made within the scope of the appended claims without departing from the spirit of the invention.

I claim:
1. A berry harvester, comprising
a vehicle having an elevated frame adapted to straddle a bush,
a pair of spaced substantially upright vibrating units carried by said frame and adapted to engage opposite sides of a bush straddled by said vehicle,
each vibrating unit including a bush-contacting member freely rotatable on a selected axis and means for vibrating said member transverse of said axis, and
means on said vehicle below each vibrating unit for collecting berries released from a bush by said vibrating unit.

2. A berry harvester, comprising
a vehicle,
a vibratory member carried by and having a part freely rotatable on said vehicle on a selected axis and engageable with a berry plant,
means for vibrating said vibratory member transversely of said axis, and
means on said vehicle for collecting berries released by said vibrating member.

3. A berry harvester, comprising
a vehicle,
a rotating shaft on said vehicle mounting an eccentric disk, a vibratory member freely rotatable on said shaft and engageable with a berry plant, and
means on said vehicle for collecting berries released by said vibratory member,
said vibratory member including a plurality of substantially radially extending fingers vibrated by rotation of said eccentric disk.

4. A berry harvester, comprising
a vehicle,
a vibratory member having parts thereof freely rotatable on said vehicle and engageable with a berry plant, and
means on said vehicle for collecting berries released by said vibrating member,
said vibratory member including a rotatable shaft,
a disk mounted eccentrically on said shaft,
a part journaled on said shaft, and
a vibration-transmitting member shiftable on said part and engaging said eccentric disk.

5. A berry harvester comprising
a vehicle,
a vibratory member having parts thereof freely rotatable on said vehicle and engageable with a berry plant, and
means on said vehicle for collecting berries released by said vibrating member,
said vibratory member including a rotatable shaft,
a disk mounted eccentrically on said shaft,
a part journaled on said shaft,
a carrier pivoted on said part and engaging said eccentric disk, and
an elongated finger carried by and projecting from said carrier.

6. A berry harvester, comprising
a vehicle,
a vibratory member having parts thereof freely rotatable on said vehicle and engageable with a berry plant, and
means on said vehicle for collecting berries released by said vibrating member,
said vibratory member including a rotatable shaft,
a disk mounted eccentrically on said shaft,
a part journaled on said shaft adjacent said disk,
a plurality of carriers pivoted to said part spaced from said shaft and from each other and each having a part engageable with said eccentric disk, and
a finger carried by and projecting substantially radially from each carrier.

7. A berry harvester, comprising
a vehicle,
a vibratory member having parts thereof freely rotatable on said vehicle and engageable with a berry plant, and
means on said vehicle for collecting berries released by said vibratory member,
said vibratory member including a shaft journaled on said vehicle and rotatable on a substantially vertical axis, and
a deflector disk journaled on said shaft above said vibratory member.

8. A device as defined in claim 6, wherein
spring means are interposed between adjacent carriers to normally spring urge a part of each carrier into contact with said ecentric disk.

9. A vibratory bush-shaking unit adapted to be carried by a traveling berry picker and comprising
a power driven rotatable shaft,
a support journaled on and rotatable independently of said shaft,
a cam disk fixed eccentrically on said shaft, and
a vibration transmitting member pivoted on said support and projecting inwardly of said pivot and spring urged into engagement with said cam disk to be pivoted thereby, and elongated bush-contacting means located outwardly of said pivot and formed of resilient material projecting substantially radially of said shaft to free berries on bush parts contacted thereby.

10. A vibratory bush-contacting unit adapted to be carried by a traveling berry picker and comprising
a power driven rotatable shaft, a cam disk fixed eccentrically on said shaft, a support journalled on said shaft and rotatable independently thereof, a plurality of carriers pivoted on said support spaced from said cam disk, outwardly projecting substantial radial bush-contacting means of resilient material mounted on each carrier, an inwardly extending cam follower on each carrier, and spring means urging said cam followers into engagement with said cam disk for pivotal oscillation of said carriers upon rotation of said shaft relative to said support to free berries fom bush parts contacted thereby.

11. A berry harvester, comprising a vehicle, a pair of spaced substantially upright rotatable shafts journaled on said vehicle and each mounting an eccentric disk, means for rotating said shafts, a freely rotatable fingered unit journaled on each shaft, means on each fingered unit engaging said eccentric disk to vibrate the unit, and means carried by said vehicle below said fingered units for collecting berries released by said fingered units.

12. A berry harvester as defined in claim 2, wherein said collecting means includes a plurality of tilted collector plates arranged in a row lengthwise of said vehicle in partially overlapping relation, each plate having a rounded upturned bush-engaging flange, means pivoting the end portions of said plates on inclined axes, spring means urging said plates to a predetermined position, a conveyor belt extending longitudinally below the lowermost marginal portions of said plates, and a freely rotatable circular member journaled substantially centrally on each plate and projecting slightly outwardly thereof.

13. A berry harvester as defined in claim 1, and a substantially horizontal transversely extending vibrating unit on said vehicle adapted to engage and vibrate the upper part of a bush straddled by the vehicle.

14. A berry harvester as defined in claim 1, and means carried by said vehicle at opposite sides thereof laterally outwardly of said vibrating units for deflecting laterally inwardly toward said collecting means the berries dropping from said bush.

15. A vibratory bush-shaking unit as defined in claim 9 wherein a plurality of vibration transmitting members are pivoted on said support in substantially equi-spaced relation, each vibration transmitting member being elongated and pivoted intermediate its ends to said support with its bush-contacting means projecting outwardly from said support.

References Cited by the Examiner

UNITED STATES PATENTS

| | | | |
|---|---|---|---|
| 178,062 | 5/1876 | Jordan et al. | 74—54 X |
| 464,742 | 12/1891 | House | 56—29 |
| 515,031 | 2/1894 | Turner | 56—29 |
| 541,062 | 6/1895 | Beekman | 56—45 |
| 1,571,206 | 2/1926 | Lautenschlager | 74—54 |
| 2,703,955 | 3/1955 | Parker et al. | 56—330 |
| 2,717,482 | 9/1955 | Hill | 56—48 |
| 2,993,323 | 7/1961 | Tubbs | 56—330 |
| 3,126,692 | 3/1962 | Weygandt et al. | 56—330 |
| 3,184,908 | 5/1965 | Rust | 56—330 |

FOREIGN PATENTS 454,086   12/1927   Germany.

ABRAHAM G. STONE, *Primary Examiner.*

RUSSEL R. KINSEY, *Examiner.*

M. C. PAYDEN, *Assistant Examiner.*